Oct. 16, 1951  W. A. BOTZ  2,571,413
SPLASH GUARD FOR VEHICLES
Filed June 28, 1949  2 Sheets-Sheet 1
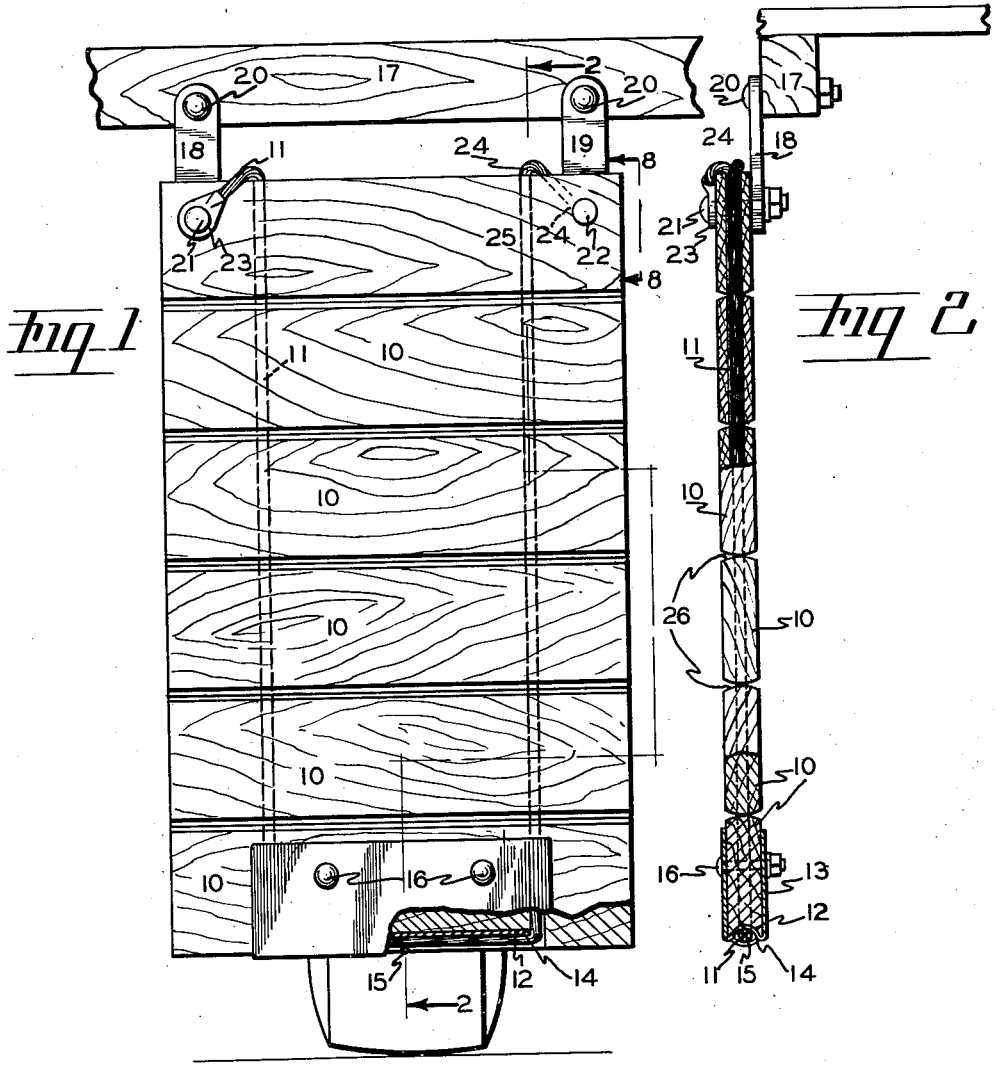
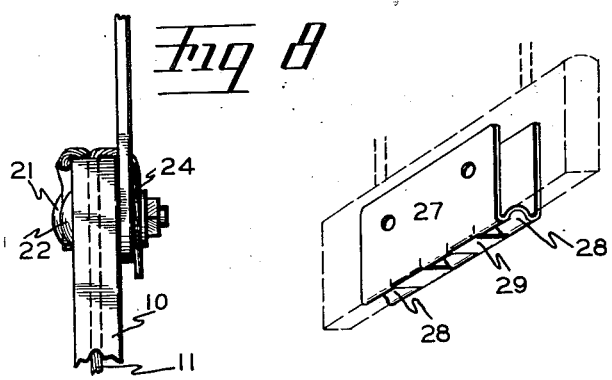
INVENTOR.
WILLIAM A BOTZ
BY
ATTORNEY Oct. 16, 1951 W. A. BOTZ 2,571,413
SPLASH GUARD FOR VEHICLES
Filed June 28, 1949 2 Sheets-Sheet 2

INVENTOR.
WILLIAM A BOTZ
BY
ATTORNEY

Patented Oct. 16, 1951

2,571,413

UNITED STATES PATENT OFFICE 2,571,413

SPLASH GUARD FOR VEHICLES

William A. Botz, Elgin, Oreg., assignor of one-half to Edward C. Botz, Elgin, Oreg.

Application June 28, 1949, Serial No. 101,846

2 Claims. (Cl. 280—154.5)

This invention relates in general to splash guards which are placed behind the rear wheels of vehicles in order to prevent mud and water being thrown rearwardly on to other vehicles coming up behind the first vehicle.

More specifically, this invention relates to splash guards suitable for use on trucks and similar vehicles where the fenders do not extend down over the rear wheels sufficiently to block the throwing of the mud or water from the rear wheels, or where there are no fenders at all over the rear wheels. It is customary for State regulations to require rear splash guards in such cases.

Heretofore splash guards, adapted for use on trucks and the like, have generally been made of rubber or similar flexible material and are fairly expensive, particularly in the case of trucks having dual wheels where the splash guards must be of relatively large size. When such vehicles, equipped with such splash guards, travel over rough roads, for example in the case of trucks and trailers used in construction work or in logging, the splash guards are subjected to considerable wear and tear. When sections of such splash guards are torn off, the guards must be replaced by new splash guards with the result that replacement of splash guards becomes a constant expense with such equipment.

An object of the present invention is to provide an improved splash guard which can be manufactured and sold at only a fraction of the price of the splash guards at present on the market.

Another object of the present invention is to provide an improved splash guard which will not only be much cheaper in price but also will considerably outlast the customary splash guards now used for trucks and the like.

A further object of this invention is to provide an improved splash guard which, when damaged, can be easily and inexpensively repaired.

A further object is to provide an improved splash guard that will not curl up or otherwise get out of shape under any conditions of usage, but will normally hang down vertically while still having sufficient flexibility to enable it to pass over obstructions encountered in the travel of the vehicle.

These objects and other incidental advantages I attain by having my improved splash guard consist entirely of separate slats of wood or other similar or suitable material, articulated, connected and mounted in a simple manner, so as to form a flexible and practical curtain, as hereinafter briefly described with reference to the accompanying drawings.

In the drawings:

Fig. 1 is an elevation of a splash guard embodying my invention, the particular splash guard illustrated being made in a size suitable for a single rear wheel of a truck;

Fig. 2 is a part sectional elevation and part side elevation taken on the line 2—2 of Fig. 1;

Fig. 3 is a perspective view of a slightly modified form of the bottom protective plate which could be used uptionally in place of the bottom plate shown on the splash guard of Figs. 1 and 2;

Fig. 8 is a fragmentary side elevation taken on line 8—8 of Fig. 1.

Figure 4:
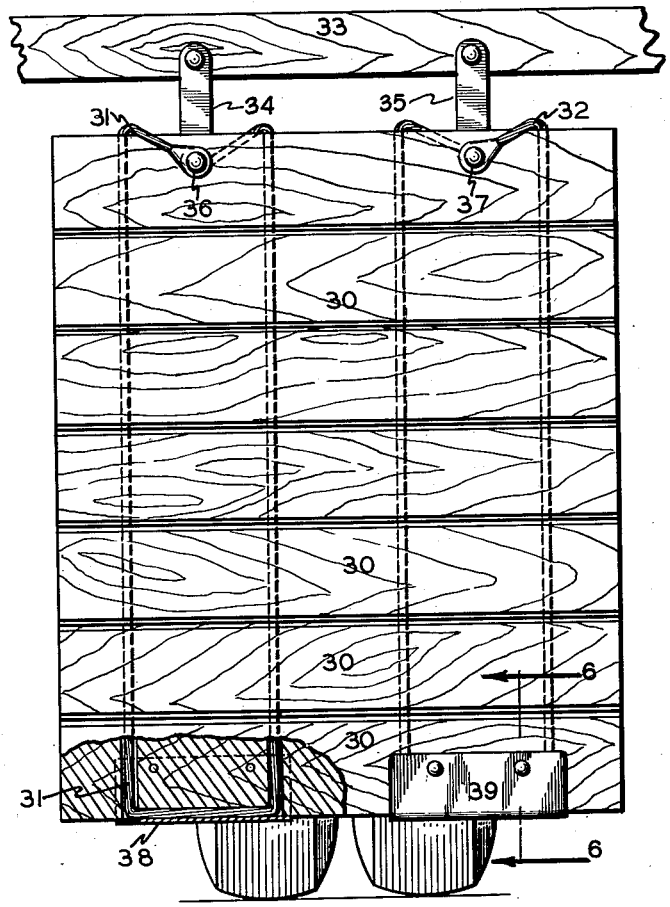
Fig. 4 is an elevation similar to Fig. 1 but showing my splash guard made in a larger size suitable for trucks with dual wheels and illustrating another slightly modified form of bottom protective plate.

Referring first to Figs. 1 and 2, my improved splash guard comprises a plurality of identical wooden slats 10 strung together on a thin pliable wire cord or cable 11. A pair of channels are bored through each slat, the channels being parallel to the main faces of the slats and also parallel to the lateral ends of the slats, and the channels in all the slats are in registration respectively. The wire cord 11 is passed through these channels in the slats.

A horizontal groove 12 is formed in the bottom edge of the bottom slat and extends between and connects the pair of vertical channels in the bottom slat for the wire cord. A bottom protective plate 13 of metal extends over a portion of the bottom slat. This bottom protective plate 13 has two parallel side portions extending over the faces of the bottom slat and a connecting grooved portion 14 made to conform in shape to the groove 12 in the bottom edge of the bottom slat. The length of this protective plate 13 is equal approximately to the distance between the two vertical channels in the slat, and the protective plate is attached to the bottom slat by bolts 16.

As apparent from Fig. 1, the wire cord 11 extends down through one vertically aligned row of channels in the slats, then along the bottom groove 14 of the plate 13, and thence up through the other alined row of channels in the slats. A metal loop 15 extends across the groove 14 of the plate 13, approximately at the longitudinal center of the groove and has its ends welded to the walls of the groove 13, and the wire cord passes inside of this loop.

The splash guard is attached to a cross member 17 of the truck platform or to any other suitable truck frame member by a pair of metal links 18 and 19, the upper ends of which are attached to the truck by the bolts 20, and the lower ends of which are similarly attached to the top slat of the splash guard by the bolts 21 and 22 respectively.

The ends of the wire cord 11 are attached to, or held by, the bolts 21 and 22 respectively in any suitable manner. For example (Figs. 1, 2 and 8), one end of the wire cord may be formed with an eye loops 23 and the bolt 21 passed through the eye loop, thus securing this end of the wire cord permanently to the top slat and metal link 18. The other end 24 of the wire cord, after being passed down and up through the slat channels, may then be given a turn around the other bolt 22 and clamped thereto by means of a washer and the bolt nut. When so secured the cord end 24 can easily be released if the splash guard should become damaged or worn to the extent that replacement of any slat or slats becomes necessary.

The longitudinal or opposed edges of the slats are rounded, as indicated at 26 in Fig. 2, so that each slat can swing slightly with respect to the slat next above it giving the entire splash guard structure sufficient flexibility to serve its purpose. The function of the bottom protective metal plate 13, as obvious, is to protect the wire cord 11 where the cord is exposed at the bottom of the splash guard, and also to lessen the wear on the bottom slat. The metal loop 15 in the groove 14 of the metal plate 13 prevents any tendency on the part of the wire cord to sag down out of the protecting groove wall of the metal plate.

Figure 7:
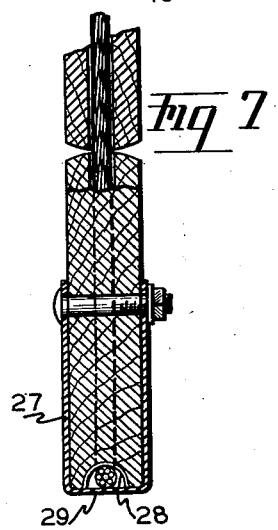
Fig. 7 is a similar fragmentary sectional elevation but showing the modified bottom plate of Fig. 3 substituted for the bottom plate of Fig. 6.

In Fig. 3 I show a slightly modified form in which the bottom protective metal plate can be made if preferred. Transverse slits are made in the bottom portion of the U-shaped protective plate 27 and alternate bottom sections formed by these slits, such as the sections 28, are stretched and deformed into concaved surfaces corresponding to the surface of the groove in the bottom edge of the bottom slat, while the remaining alternate sections 29 are left straight. The wire cord, as indicated by the broken lines in Fig. 3, then passes on the inside of the sections 39 and on the outside of the sections 28. This modified form of bottom plate is also illustrated in Fig. 7.

Figure 5:
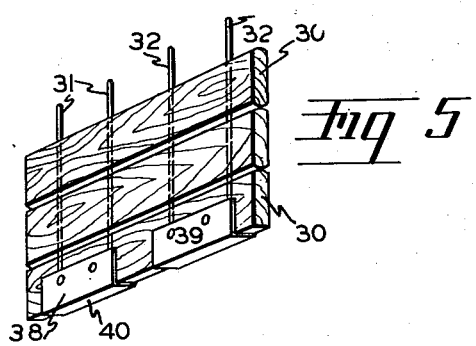
Fig. 5 is a perspective view of the bottom portion of the splash guard of Fig. 4 but drawn to a smaller scale.

When my splash guard is made in a larger size, suitable for a vehicle having dual wheels, as indicated by the dual wheel W—W in Fig. 4, I prefer to make my splash guard with a pair of wire cords instead of the single wire cord, and to have each cord pass through a pair of aligned vertical channels in the slats. Thus, referring to Figs. 4 and 5, the slats 30 in the large size splash guard illustrated, are mounted on a pair of flexible wire cords 31 and 32. Each of these wire cords 31 and 32 passes down through a vertical row of channels in the slats, then along a bottom groove on the bottom edge of the lowest slat and thence upwardly through another vertical row of slats in the same manner as the wire cord 11 in the smaller size splash guard of Fig. 1 previously described. The splash guard is suspended from the truck or vehicle frame member 33 by the metal links 34 and 35, the bottom ends of which links are attached to the top slat of the splash guard by the bolts 36 and 37 respectively.

While the two ends of each of the wire cords 31 and 32 on which the slats 30 are mounted may be secured in any desired manner, I prefer to secure the cord ends to the bolts 36 and 37. A satisfactory way of doing this is to form one end of each wire cord with an eye loop, attaching the eye loops to the bolts, and then to have the other ends of the cords clamped in place by the nuts on the bolts similar to the manner previously described with reference to Fig. 1. Thus the bolt 36 (Fig. 4) passes through the eye loop of the wire cord 31 on one face of the top slat, and the opposite end of the same wire cord is given a turn around the other end of the same bolt 36 on the opposite face of the top slat and clamped there with a suitable washer and bolt nut (not shown). Similarly the ends of the wire cord 32 would be secured to the bolt 37 on the faces of the top slats respectively. When any replacement of the slats becomes necessary one end of each cord is then easily unfastened.

Figure 6:
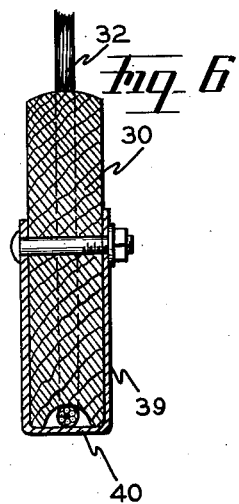
Fig. 6 is a fragmentary sectional elevation on the line 6—6 of Fig. 4 but drawn to a larger scale.

A pair of bottom protective metal plates 38 and 39 are provided on the bottom slat for the wire cords 31 and 32 respectively. These protective plates are preferably in the form illustrated in Figs. 1 and 2, or in the form illustrated in Figs. 3 and 7, as previously described, although they could be made in the further modified and simplified form illustrated in Figs. 4, 5 and 6 in which the protective plates are merely U-shaped members having a straight bottom portion 40 joining the two side walls and extending over the grooves in the bottom edge of the bottom slat and extending entirely over the wire cords in the grooves. The bottom plates, when made in this simplified form, need not be limited in length to the distance between the two vertical channels of each pair, but can extend beyond the ends of the grooves. In fact, a single long protective plate (not shown) of this type could extend over both grooves and both cords on the bottom slat. However I prefer to use a pair of shorter protective plates of the type shown in Figs. 1 and 2 or of the type shown in Figs. 3 and 7, especially if cheap grades of soft wood are used for the slats, since otherwise the pull of the wire cords would cause the grooves in the bottom edges of the bottom slat gradually to be cut deeper, ultimately causing slack to develop and the slats to drop lower.

Further modifications could be made in my splash guard within the scope of my invention. However the splash guards which I have illustrated and described I regard as the preferred forms for the carrying out of my invention, since splash guards so made have proven very satisfactory for use on vehicles of the type indicated and are so inexpensive to manufacture and repair.

I claim:

1. In a vehicle splash guard of the character described, a plurality of similar wooden slats arranged together one above the other normally in a vertical plane, a pair of vertical channels extending entirely through each slat, said channels in said slats being in vertical alignment respectively, a groove in the bottom edge of the lowermost slat extending from one channel to the other channel, a flexible element extending down through one set of channels and along said groove and up through the other set of said channels, a pair of links for mounting said splash guard in place behind a vehicle wheel, bolts connecting said links to the uppermost slat, one end of said flexible element formed with an eye loop and attached to one of said bolts, the opposite end of said flexible element adjustably clamped to one of said bolts by the nut on the bolt, and a bottom protective plate lining a portion of said groove in said bottom slat, said plate having two parallel side portions extending part away over the side faces of said bottom slat respectively, and a bottom strap extending across said groove to hold said flexible element in said lined groove.

2. A vehicle splash guard including a plurality of similar wooden slats arranged together one above the other normally in a vertical plane, a pair of vertical channels extending through each slat, said channels in said slats being in vertical alignment respectively, a groove in the bottom edge of the lowermost slat extending from one channel to the other channel, a flexible element extending down through one set of channels and along said groove and up through the other set of said channels, the opposed edges of said slats being rounded to permit each slat to swing slightly with respect to the slat next above it, a pair of links for mounting said splash guard in place behind a vehicle wheel, bolts connecting said links to the uppermost slat, the ends of said flexible element secured to said bolts respectively, and a bottom protective plate lining a portion of said groove in said bottom slat, said plate having two parallel side portions extending part way over the side faces of said bottom slat respectively, and a bottom strap extending across said groove to hold said flexible element in said lined groove.

WILLIAM A. BOTZ.

REFERENCES CITED

The following references are of record in the file of this patent:

UNITED STATES PATENTS

| Number | Name | Date |
| --- | --- | --- |
| 2,000,220 | Cohen | May 7, 1935 |

FOREIGN PATENTS

| Number | Country | Date |
| --- | --- | --- |
| 56,289 | Switzerland | Mar. 21, 1911 |
| 321,968 | Italy | Oct. 23, 1934 |